United States Patent
Khasnabish (10) Patent No.: US 9,210,197 B2
(45) Date of Patent: *Dec. 8, 2015

(54) PACKET-SWITCHED NETWORK-TO-NETWORK INTERCONNECTION INTERFACE

(71) Applicant: Verizon Patent and Licensing Inc., Basking Ridge, NJ (US)

(72) Inventor: Bhumip Khasnabish, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 351 days.

This patent is subject to a terminal disclaimer.

(21) Appl. No.: 13/854,351

(22) Filed: Apr. 1, 2013

(65) Prior Publication Data

US 2013/0227151 A1    Aug. 29, 2013

Related U.S. Application Data

(63) Continuation of application No. 12/837,305, filed on Jul. 15, 2010, now Pat. No. 8,412,834, which is a continuation of application No. 11/945,564, filed on Nov. 27, 2007, now Pat. No. 7,761,579.

(51) Int. Cl.
*G06F 15/16* (2006.01)
*H04L 29/06* (2006.01)

(52) U.S. Cl.
CPC .......... *H04L 65/1066* (2013.01); *H04L 63/164* (2013.01); *H04L 65/104* (2013.01)

(58) Field of Classification Search
USPC ........................................ 709/221, 227, 230
See application file for complete search history.

(56) References Cited

U.S. PATENT DOCUMENTS

| | | |
|---|---|---|
| 6,611,533 B1 | 8/2003 | Liao et al. |
| 2003/0204619 A1 | 10/2003 | Bays |
| 2004/0044762 A1 | 3/2004 | Peacock |
| 2005/0125543 A1 | 6/2005 | Park et al. |

(Continued)

FOREIGN PATENT DOCUMENTS

WO    WO-2009/070646    6/2009

OTHER PUBLICATIONS

"Digital Network Echo Cancellers," Series G: Transmission Systems and Media, Digital Systems and Networks, ITU-T Recommendation G.168, Aug. 2004, 112 pages.

(Continued)

*Primary Examiner* — Jason Recek (57) ABSTRACT

An exemplary method includes at least on network element of a first network domain exchanging signaling and media border processing information with at least one network element of a second network domain by way of a secure packet-switched connection, exchanging service policy information with the at least one network element of the second network domain by way of the secure packet-switched connection, peering sessions associated with different service types between the first network domain and the second network domain by way of a packet-switched network-to-network interconnection interface ("NNII") in accordance with the exchanged signaling and media border processing information, and enforcing different performance threshold specified by the service policy information for peering the sessions associated with the different service types.

21 Claims, 4 Drawing Sheets

(56) References Cited

U.S. PATENT DOCUMENTS

| | | | |
|---|---|---|---|
| 2005/0262232 A1 | 11/2005 | Cuervo et al. | |
| 2007/0258456 A1 | 11/2007 | Khouderchah et al. | |
| 2007/0260735 A1 | 11/2007 | Olsson et al. | |

OTHER PUBLICATIONS

"General Aspects of Digital Transmission Systems, Coding of Speech at 8 kbit/s Using Conjugate-Structure Algebraic-Code-Excited Linear-Prediction (CS-ACELP), ITU-T, G.729," 39 pages, Mar. 1996.

"IEEE Standard 802,1D, IEEE Standard for Local and Metropolitan Area Networks, Media Access Control (MAC) Bridges", IEEE Computer Society, Copyright 2004, 280 pages.

"IEEE Standard for Local Metropolitan Area Networks, Virtual Bridged Local Area Networks," IEEE Standard for Local Metropolitan Area Networks, IEEE Standard 802.1Q, 2005, May 19, 2006, 303 pages.

"Interworking Between Session Initiation Protocol (SIP) and Bearer Independent Call Control Protocol or ISDN User Part," Series Q: Switching and Signalling, ITU-T Recommendation Q.1912.5, Mar. 2004, 110 pages.

"Interworking Between the 3GPP CS Domain with BICC or ISUP as Signalling Protocol and External SIP-I Networks (Release 7)," 3rd Generation Partnership Project; Technical Specification Group Core Network and Terminals, 3GPP TS 29.164, V1.1.0, Apr. 2007, 18 p.

"Interworking Between the IM CN Subsystem and IP Networks (Release 7)", 3rd Generation Partnership Project; Technical Specification Group. Core Network and Terminals, 3GPP TS 29.162, V7.1.0, Mar. 2006, pp. 1-18.

"Network Grade of Service Parameters and Target Values for Circuit-Switched Services in the Evolving ISDN," ITU-T Recommendation E.721, May 1999, 13 pages.

"Procedures for Document Facsimile Transmission in the General Switched Telephone Network," Series T: Terminals for Telematic Services, ITU-T Recommendation T.30, Sep. 2005, 322 pages.

"Procedures for Real-Time Group 3 Facsimile Communication Over IP Networks, Amendment 2," Series T: Terminals for Telematic Services, ITU-T Recommendation T.38 Amendment 2, Annex D, Feb. 2000, 24 pages.

"Pulse Code Modulation (PCM) of Voice Frequencies," General Aspects of Digital Transmission Systems, Technical Equipments, ITU-T Recommendation G.711, Copyright 1988, 12 pages.

Security Architecture for Open Systems Interconnection for CCITT Applications, Data Communication Networks: Open Systems Interconnection (OSI); Security, Structure and Applications, ITU-T Recommendation X.800, Copyright 1991, 48 pages.

"The International Public Telecommunication Numbering Plan," Series E: Overall Network Operation, Telephone Service, Service Operation and Human Factors, ITU-T Recommendation E.164, 27 pages, May 1997.

Arkko et al., "Security Mechanism Agreement for the Session Initiation Protocol (SIP), RFC 3329", Network Working Group, Internet Engineering Task Force (IETF), The Internet Society, Jan. 2003, pp. 1-24.

Ash et al., "Requirements for an MPLS Inter-Carrier interconnect", MFA Forum's Requirements, MPLS/FR Alliance Technical Committee Contribution, Feb. 13, 2005, pp. 1-53.

Baugher et al., "The Secure Real-time Transport Protoco (SRTP), RFC 3711," Network Working Group, Internet Engineering Task Force (IETF), The Internet Society, Mar. 2004, pp. 1-56.

Bradner, "Key words for use in RFC's to Indicate Requirement Levels, RFC 2119," Harvard University, Network Working Group Internet Engineering Task Force (IETF), Mar. 1997, pp. 1-3.

Camarillo et al., "Integrated Services Digital Network (ISDN) User Part (ISUP) to Session Initiation Protocol (SIP) Mapping, RFC 3398," Network Working Group, Internet Engineering Task Force (IETF), The Internet Society, Nov. 2002, pp. 1-68.

Camarillo et al., "Integration of Resource Management and Session Initiation Protocol (SIP), RFC 3312," Network Working Group, Internet Engineering Task Force (IETF), The Internet Society, Oct. 2002, pp. 1-30.

Camarillo et al., "Mapping of Integrated Services Digital Network (ISDN) User Part (ISUP) Overlap Signalling to the Session Initiation Protocol (SIP), RFC 3578," Network Working Group, Internet Engineering Task Force, The Internet Society, Jul. 2003, 13 pgs.

Campbell, et al., "Session Initiation Protocol (SIP) Extension for Instant Messaging, RFC 3428," Network Working Group, Internet Engineering Task Force (IETF), The Internet Society, pp. 1-18, Dec. 2002.

Casner et al., "Compressing IP/UDP/RTP Headers for Low-Speed Serial Links, RFC 2508," Network Working Group, Internet Engineering Task Force (IETF), Feb. 1999, pp. 1-24.

Davie et al., "An Expedited Forwarding PHB (Per-Hop Behavior), RFC 3246," Obsoletes: 2598, Network Working Group, Internet Engineering Task Force (IETF), The Internet Society, Mar. 2002, pp. 1-16.

Dierks et al., "The TLS Protocol Version 1.0, RFC 2246", Network Working Group, Internet Engineering Task Force (IETF), The Internet Society, pp. 1-80, Jan. 1999.

Dolly, et al., "Output Baseline text for the IP NNI Standard for VoIP from the Mar. 2006 Meeting," PTSC-SAC, Las Vegas, NV, Mar. 20-24, 2006, pp. 1-46.

Donovan et al., "Session Timers in the Session Initiation Protocol (SIP), RFC 4028," Cisco Systems, Network Working Group, Internet Engineering Task Force (IETF), The Internet Society, Apr. 2005, pp. 1-27.

Falstrom, et al., "The E. 164 to Uniform Resource Identifiers (URI) Dynamic Delegation Discovery System (DDDS) Application (ENUM), RFC 3761," Network Working Group, The Internet Society, pp. 1-18, Apr. 2004.

Fielding et al., "Hypertext Transfer Protocol, RFC 2616," Obsoletes: 2068, Network Working Group, Internet Engineering Task Force (IETF), Jun. 1999, pp. 1-114.

Friedman et al., "RTP Control Protocol Extended Reports (RTCP XR), RFC 3611," Network Working Group, Internet Engineering Task Force (IETF), The Internet Society, Nov. 2003, pp. 1-55.

Garcia-Martin, "Input 3rd-Generation Partnership Project (3GPP) Release 5 Requirements on the Session Initiation Protocol (SIP), RFC 4083," Nokia, Network Working Group, Internet Engineering Task Force (IETF), The Internet Society, May 2005, pp. 1-36.

Garcia-Martin, et al., "Private Header (P-Header) Extensions to the Session Initiation Protocol (SIP) for the 3rd-Generation Partnership Project (3GPP), RFC 3455," Network Working Group, The Internet Society, pp. 1-34, Jan. 2003.

Glenn et al., "The NULL Encryption Algorithm and Its Use With IPsec, RFC 2410," Network Working Group, Internet Engineering Task Force (IETF), The Internet Society, p. 1-6, Nov. 1998.

Gulbrandsen, et al., "A DNS RR for Specifying the Location of Services (DNS SRV), RFC 2782," Network Working Group, The Internet Society, Feb. 2000, pp. 1-12.

Handley, et al., "SDP: Session Description Protocol, RFC 2327," Network Working Group, The Internet Society, 43 pages, Apr. 1998.

Hellstrom, RTP Payload for Text Conversation, RFC 2793, Network Working Group, Internet Engineering Task Force (IETF), The Internet Society, May 2000, pp. 1-10.

Huang et al. "A Traffic-Based Method of Detecting Dead Internet Key Exchange (IKE) Peers, RFC 3706," Cisco Systems, Inc., Network Working Group, The Internet Society, Feb. 2004. pp. 1-13.

Huitema, "Real Time Control Protocol (RTCP) attribute in Session Description Protocol (SDP), RFC 3605," Microsoft Inc., Network Working Group, Internet Engineering Task Force (IETF), The Internet Society, Oct. 2003, pp. 1-8.

Jenkins et al., "NGN Control Plane Overload and Its Management, MSF Technical Report MSF-TR-ARCH-007-FINAL," MultiService Forum, Feb. 2006, 11 pages.

Jennings, et al., "Private Extensions to the Session Initiation Protocol (SIP) for Asserted Identity within Trusted Networks, RFC 3325," Network Working Group, The Internet Society, pp. 1-18, Nov. 2002.

(56) References Cited

OTHER PUBLICATIONS

Kent et al., "IP Authentication Header, RFC 2402," Network Working Group, Internet Engineering Task Force (IETF), The Internet Society, pp. 1-22, Nov. 1998.
Kent et al., "IP Encapsulating Security Payload (ESP), RFC 2406," Network Working Group, Internet Engineering Task Force (IETF), http://www.ietf.org/rfc/rfc2406.txt, pp. 1-22, Nov. 1998.
Kent at al., "Security Architecture for the Internet Protocol, RFC 2401," Network Working Group, Internet Engineering Task Force (IETF), The Internet Society, pp. 1-66, Nov. 1998.
Koren et al., "Enhanced Compressed RTP (CRTP) for Links with High Delay, Packet Loss and Reordering, RFC 3545," Network Working Group, Internet Engineering Task Force (IETF), The Internet Society, Jul. 2003, pp. 1-22.
Krishnamurthy et al., MSF Session Border Gateway Requirements, MSF-PS-SBG-001.00-FINAL, MultiService Forum, Apr. 27, 2006, 28 pages.
Madson et al., "The Use of HMAC-MD5-96 within ESP and AH, RFC 2403," Network Working Group, Internet Engineering Task Force (IETF), The Internet Society, pp. 1-7, Nov. 1998.
Madson et al., "The Use of HMAC-SHA-1-96 within ESP and AH RFC 2404," Network Working Group, Internet Engineering Task Force (IETF), The Internet Society, pp. 1-7, Nov. 1998.
Maughan et al., "Internet Security Association and Key Management Protocol (ISAKMP), RFC 2408," Network Working Group, Internet Engineering Task Force (IETF), The Internet Society, pp. 1-86, Nov. 1998.
Mealling, "Dynamic Delegation Discovery System (DDDS), RFC 3405," VeriSign, Inc., Network Working Group, Internet Engineering Task Force (IETF), The Internet Society, Oct. 2002, pp. 1-10.
Mills, "Network Time Protocol (Version 3), RFC 1305," Specification, Implementation and Analysis, University of Delaware, Internet Engineering Task Force (IETF), Mar. 1992, 107 pages.
Nichols et al., Definition of the Differentiated Services Field (DS Field) in the IPv4 and IPv6 Headers, RFC 2474, Obsoletes: 1455, 1349, Network Working Group, Internet Engineering Task Force (IETF), The Internet Society, Dec. 1998, pp. 1-20.
Niemi, "Session Initiation Protocol (SIP) Extension for Event State Publication, RFC 3903," Nokia, Network Working Group, Internet Engineering Task Force (IETF), The Internet Society, Oct. 2004, pp. 1-32.
Parsons, "Real-time Facsimile (T.38)—image/t38 MIME Sub-type Registration, RFC 3362," Nortel Networks, Network Working Group, Internet Engineering Task Force (IETF), The Internet Society, Aug. 2002, pp. 1-5.
Parsons, "Voice Profile for Internet Mail (VPIM) Addressing, RFC 3804," Nortel Networks, Network Working Group, Internet Engineering Task Force (IETF), The Internet Society, Jun. 2004, pp. 1-15.
Peterson, "A Presence-based GEOPRIV Location Object Format, RFC 4119," Network Working Group, Internet Engineering Task Force (IETF), The Internet Society, Dec. 2005, pp. 1-24.
Peterson, "A Privacy Mechanism for the Session Initiation Protocol (SIP), RFC 3323," Network Working Group, Internet Engineering Task Force (IETF), The Internet Society, Nov. 2002, pp. 1-22.
Piper, "The Internet IP Security Domain of Interpretation for ISAKMP, RFC 2407," Network Working Group, Internet Engineering Task Force (IETF), The Internet Society, pp. 1-32, Nov. 1998.
Piscitello et al., "The Transmission of IP Datagrams over the SMDS Service, RFC 1209", Bell Communications Research, Internet Engineering Task Force (IETF), Mar. 1991, 8 pages.
Postel et al., "File Transfer Protocol, RFC 959," Obsoletes RFC: 765, Internet Engineering Task Force (IETF), Oct. 1985, pp. 1-69.
Postel, et al., "Internet Protocol, DARPA Internet Program Protocol Specification, RFC 791," Information Sciences Institute, University of Southern California, 48 pages, Sep. 1981.
Postel, et al., "Transmission Control Protocol, RFC 793," DARPA Internet Program, Protocol Specification, Information Sciences Institute, University of Southern California, Internet Engineering Task Force (IETF), Sep. 1980, 89 pages.

Postel, "User Datagram Protocol, RFC 768", Internet Engineering Task Force (IETF), Aug. 28, 1980, pp. 1-3.
Roach, "Session Initiation Protocol (SIP)—Specific Event Notification, RFC 3265," Network Working Group, The Internet Society, pp. 1-37, Jun. 2002.
Rosen et al., "BGP/MPLS VPNs, RFC 2547," Cisco Systems, Inc., Network Working Group, The Internet Society, pp. 1-25, Mar. 1999.
Rosenberg et al., "An Offer/Answer Model with the Session Description Protocol (SDP), RFC 3264," Network Working Group, Internet Engineering Task Force (IETF), The Internet Society, pp. 1-25, Jun. 2002.
Rosenberg et al., "An RTP Payload Format for Generic Forward Error Correction, RFC 2733," Network Working Group, Internet Engineering Task Force (IETF), Dec. 1999, pp. 1-26.
Rosenberg et al., "Session Initiation Protocol (SIP): Locating SIP Servers, RFC 3263," Network Working Group, The Internet Society, pp. 1-17, Jun. 2002.
Rosenberg, et al., "SIP: Session initiation Protocol—RFC 3261," Network Working Group, The Internet Society, 252 pages, Jun. 2002.
Rosenberg et al., "STUN—Simple Traversal of User Datagram Protocol (UDP) Through Network Address Translators (NATs), RFC 3489," Network. Working Group, Internet Engineering Task Force (IETF), The Internet Society, pp. 1-47, Mar. 2003.
Rosenberg, "The Session Initiation Protocol (SIP) Update Method, RFC 3311," Dynamicsoft Inc., Network Working Group, The Internet Society, pp. 1-13, Sep. 2002.
Rosenberg, et al., "Traversal Using Relay NAT (TURN)—Inernet Draft", Internet Engineering Task Force (IETF), The Internet Society, Sep. 9, 2005, pp. 1-40.
Schulzrinne et al.. "Communications Resource Priority for the Session Initiation Protocol (SIP)—Internet Draft," Network Working Group, Internet Engineering Task Force (IETF), Jul. 13, 2005, pp. 1-5.
Schulzrinne, et al., "RTP Payload for DTMF Digits, Telephony Tones, and Telephony Signals, RFC 4733," Obsoletes: 2833, Network Working Group, Internet Engineering Task Force (IETF), Dec. 2006, p. 1-49.
Schulzrinne et al., "RTP Profile for Audio and Video Conferences with Minimal Control, RFC 3551," Obsoletes: 1890, Network Working Group, Internet Engineering Task Force (IETF), The Internet Society, Jul. 2003, pp. 1-38.
Schulzrinne et al., "RTP: A Transport Protocol for Real-Time Applications, RFC 3550," Obsoletes: 1889, Network Working Group, Internet Engineering Task Force (IETF), The Internet Society, Jul. 2003, pp. 1-89.
Schulzrinne et al., "The Reason Header Field for the Session Initiation Protocol (SIP), RFC 3326", Network Working Group, Internet Engineering Task Force (IETF), The Internet Society, Dec. 2002, pp. 1-8.
Schulzrinne, "The tel URI for Telephone Numbers RFC 3966," Obsoletes: 2806, Columbia University, Network Working Group, Internet Engineering Task Force (IETF), The Internet Society, Dec. 2004, pp. 1-17.
Sinnreich et al., "SIP Telephony Device Requirements and Configurations, RFC 4504," Network Working Group, Internet Engineering Task Force (IETF), The Internet Society, May 2006, 31 pages.
Sparks, "Session Initiation Protocol (SIP) Referred-By Mechanism, RFC 3892," Network Working Group, Internet Engineering Task Force (IETF), The Internet Society, Sep. 2004, pp. 1-25.
Stewart et al., "Stream Control Transmission Protocol, RFC 2960," Network Working Group,Internet Engineering Task Force (IETF), The Internet Society, Oct. 2000, pp. 1-134.
Vemuri et al., "Session Initiation Protocol for Telephones (SIP-T): Context and Architectures, RFC 3372," Network Working Group, Internet Engineering Task Force (IETF), The Internet Society, Sep. 2002, 19 pages.
Watson, "Short Term Requirements for Network Asserted Identity, RFC 3324", Nortel Networks, Network Working Group, Internet Engineering Task Force (IETF), The Internet Society, Nov. 2002, pp. 1-11.
Yu, "Number Portability Parameters for the 'tel' URI, RFC 4694," Network Working Group, Internet Engineering Task Force (IETF), The Internet Society, Oct. 2006, pp. 1-15.

PACKET-SWITCHED NETWORK-TO-NETWORK INTERCONNECTION INTERFACE

RELATED APPLICATIONS

This application is a continuation application of U.S. patent application Ser. No. 12/837,305, filed on Jul. 15, 2010, and entitled PACKET-SWITCHED NETWORK-TO-NETWORK INTERCONNECTION INTERFACE, which is a continuation application of U.S. patent application Ser. No. 11/945,564, filed on Nov. 27, 2007, and entitled PACKET-SWITCHED NETWORK-TO-NETWORK INTERCONNECTION INTERFACE. The content of these applications is incorporated herein by reference in its entirety.

BACKGROUND INFORMATION

For years, reliable voice communication services have been provided over circuit-switched networks such as the Public Switched Telephone Network ("PSTN"). More recently, packet-switched networks capable of carrying data and voice communications have been developed. Some packet-switched networks such as the Internet or managed Internet Protocol ("IP") networks allow IP enabled devices to send and receive IP-based voice communications between one another over the networks. IP-based voice communication services are commonly referred to as Voice over Internet Protocol ("VoIP") services.

Traditionally, operators of communication network domains such as PSTN domains or VoIP network domains have entered into "peering agreements" with one another. Peering agreements allow communications to be "peered," i.e., handed off, from one network domain to another, as agreed to by operators of the network domains. For example, peering agreements are commonly used to allow voice traffic to be peered between different carrier PSTN domains.

However, traditional peering arrangements are typically service and/or technology specific and consequently rather limited in scope and flexibility. This is due at least in part to limitations of standard network-to-network interface technologies. For example, a conventional peering agreement may allow voice traffic to be carried between distinct network domains using a particular voice communication technology, but implementation of another peering agreement and/or special interconnection arrangements are generally required to allow other types of services (e.g., video services) and/or communication signals and formats to be peered between the network domains. The establishment of separate peering agreements and interconnection interfaces for different services and communication technologies is expensive, time-consuming, and often subject to bureaucratic influence and delay.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

Exemplary packet-switched network-to-network interconnection interface systems and methods are described herein. In certain embodiments, a packet-switched network-to-network interconnection interface is provided for interconnecting network elements associated with distinct network domains such that network services traffic (e.g., service sessions) can be peered between the network domains by way of the network-to-network interconnection interface. The network-to-network interconnection interface may be configured to enable a variety of services and service types to be transparently peered between the network domains, thereby extending the reach of the services. Significantly, the network-to-network interconnection interface may enable services to be conveniently, flexibly, and seamlessly added, tested, and rolled out to users across network boundaries, without having to make separate, special interconnection arrangements for the different services and service types. In this or similar manner, the network-to-network interconnection interface may allow for flexible customization for peering a variety of services between network domains. Accordingly, a network-to-network interconnection interface may support peering of network traffic between distinct network domains without compromising service policies (e.g., performance standards) associated with the services.

An exemplary packet-switched network-to-network interconnection interface, as well as examples of its establishment and operation, will now be described in reference to the drawings.

Figure 1:
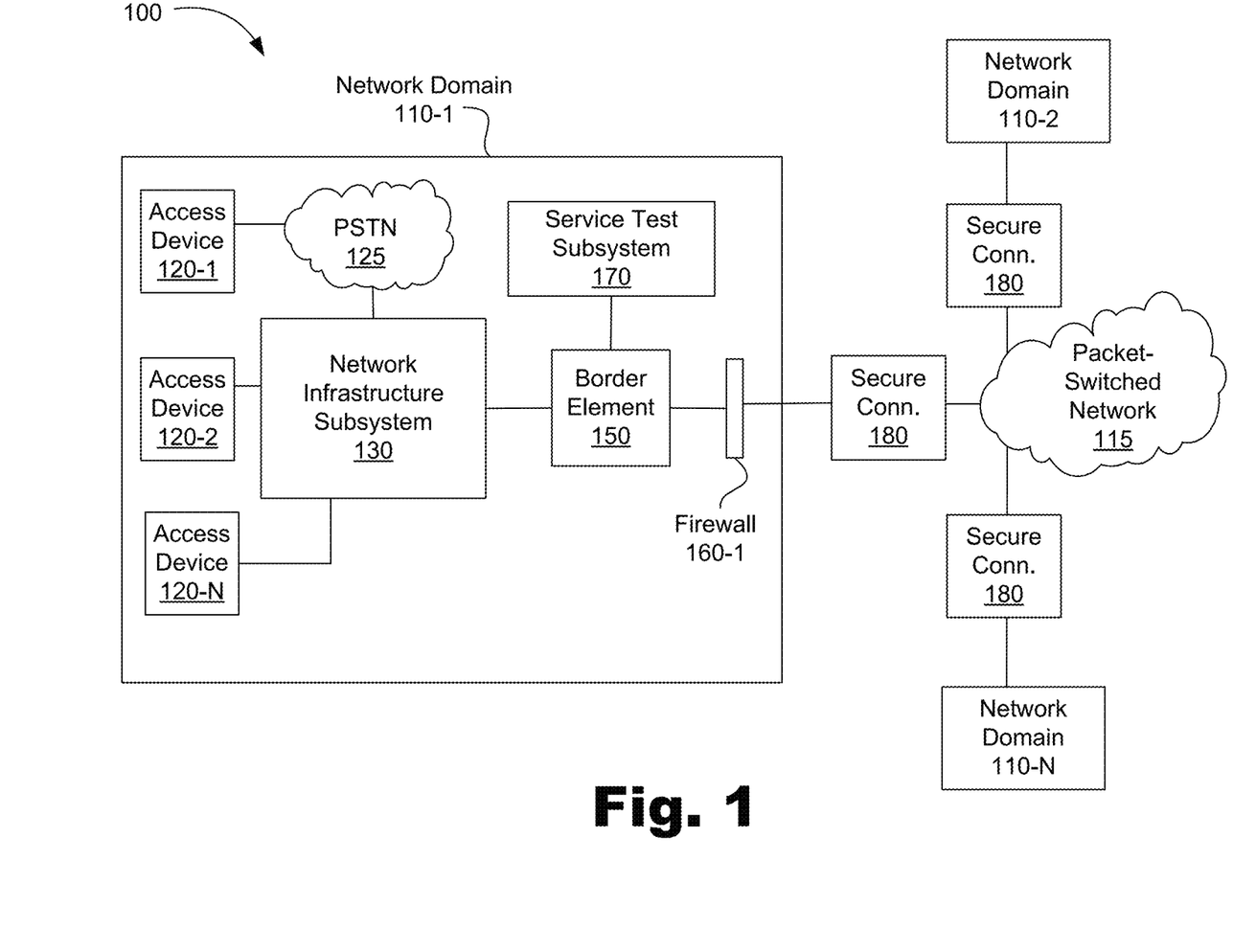
FIG. 1 illustrates an exemplary packet-switched network-to-network interconnection interface system.

FIG. 1 illustrates an exemplary packet-switched network-to-network interconnection interface system 100 (or simply "system 100"). System 100 may include components configured to provide one or more packet-switched network-to-network interconnection interfaces for peering network traffic between distinct network domains 110-1 through 110-N (collectively "network domains 110"). The network traffic may be associated with a variety of services and service types, including real time, non-real time, near-real time, and soft-real time end-to-end services, for example. Accordingly, a packet-switched network-to-network interconnection interface may be provided and configured to support peering of real time, non-real time, near-real time, and soft-real time end-to-end services between distinct network domains 110. As described below, service policies associated with various services and service types may be determined and enforced for service sessions peered over the packet-switched network-to-network interconnection interface. Examples of services that may be peered include, but are not limited to, voice services, video services, electronic messaging services (e.g., e-mail, short messaging services ("SMS"), instant messaging services, multimedia messaging services ("MMS")), and gaming services.

The network-to-network interconnection interface may be configured to facilitate peering of a variety of services that utilize different communication technologies, protocols, media, and/or data formats. Peered network traffic may carry a variety of different media associated with the services. For example, network traffic may carry voice, data, audio, video, multimedia, short-message, instant messaging, or other types of media, or a combination or sub-combination thereof.

Discrete instances of services peered across the network-to-network interconnection interface may be referred to as "service sessions" or simply "sessions." A service session may include establishment of a connection between network elements, transmission of network traffic associated with a service over the connection, and release of the connection. Services may be selectively peered between network domains 110 on a session-by-session basis. A service session may include exchange of signaling messages, i.e., a signaling session, and transmission of any media associated with a service, i.e., a media transport session, including any of the examples of media listed above.

In some examples, components of system 100, including one or more of the functional elements described below with reference to FIGS. 2 and 3, may include any computer hardware and/or instructions (e.g., software programs), or combinations of software and hardware, configured to perform the processes described herein. In particular, it should be understood that components of system 100 may be implemented on one physical computing device or may be implemented on more than one physical computing device. Accordingly, system 100 may include any one of a number of computing devices, including but not limited to routers, gateways (e.g., border gateways), controllers, switches, servers, client devices, and other network elements, and may employ any of a number of computer operating systems.

Accordingly, the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

As shown in FIG. 1, network domains 110-1 through 110-N may be communicatively interconnected by way of a packet-switched network 115, which may include an IP network such as the Internet, a managed IP network, or any other packet-switched network. Network 115 may support any packet switching protocol, including Internet Protocols such as IPv4, IPv6, Multi-Protocol Label Switching ("MPLS") protocol, and/or future versions of the Internet Protocol.

In certain embodiments, network domains 110 may be associated with one or more service providers (e.g., telecommunications carriers). For example, each of the network domains 110 may be managed and/or operated by a different service provider, or a service provider may manage and/or operate more than one of the network domains 110.

Network domains 110 may be heterogeneous. For example, network domain 110-1 may provide different services, enforce different service policies, and/or utilize different communication technologies as compared to another network domain 110-2. However, there may be some overlap in that network domains 110 may provide some common or related services, enforce common or similar policies, and/or utilize common or related communications technologies. For example, network domains 110-1 and 110-2 may both provide VoIP services, but utilize different technologies to do so. Network domain 110-1 may also provide services (e.g., video services) that are not provided by network domain 110-2, or are supported by only a subset of elements in network domain 110-2.

FIG. 1 illustrates exemplary elements of network domain 110-1. Exemplary elements of other network domains 110-2 and 110-N are not shown in FIG. 1 but may be similar or different to those shown for network domain 110-1. As illustrated in FIG. 1, network domain 110-1 may include access devices 120-1 through 120-N (collectively "access devices 120"), which may be configured to provide users with access to services provided by way of network domain 110-1. The access devices 120 may provide access to a variety of services, including any of those mentioned herein. As an example, in FIG. 1, access device 120-1 may include a Plain Old Telephone Service ("POTS") telephone configured to access services provided over a Public Switched Telephone Network 125, access device 120-2 may include an IP-enabled device (e.g., an IP phone or a combination of a POTS telephone and an Analog Telephone Adapter ("ATA")), and access device 120-N may include a Session Initiation Protocol ("SIP") enabled user access device. Of course, access devices 120 may include other types of devices, including, but not limited to, one or more desktop computers, laptop computers, tablet computers, personal computers, personal data assistants, wireless communication devices (e.g., cellular telephones and satellite pagers), wireless internet devices, embedded computers, video phones, Verizon One® phones, soft phones, video-enabled wireless phones, mainframe computers, mini-computers, vehicular computers, entertainment devices, gaming devices, music devices, video devices, closed media network access devices, set-top boxes, and any other devices capable of providing users with access to services provided by way of network domain 110-1. Access device 120 can also include various peripherals such as a terminal, keyboard, mouse, display screen, printer, stylus, input device, output device, or any other apparatus that can help provide user interaction with access device 120.

As will be appreciated, access devices 120 may be heterogeneous in that they may provide different capabilities supportive of different services and features. For example, a particular access device 120 may have capabilities for processing and providing user access to voice services but not video services, while another access device 120 may have capabilities for processing and providing user access to both voice and video services.

Access devices 120 may be communicatively connected, directly or indirectly, to one or more network elements in network domain 110-1. The network elements and one or more connections interconnecting the network elements may be arranged in any suitable manner and may include a variety of network devices and transmission media, and utilize a variety of communication technologies (e.g., Internet Protocol and Signaling System 7 ("SS7") signals). The network elements and their interconnections and supported communication technologies may be represented as a network infrastructure subsystem 130 shown in FIG. 1.

Network elements and connections in network infrastructure subsystem 130 may be configured to utilize one or more communications technologies for processing (e.g., routing) and transporting network traffic in a manner that may provide services to access devices 120. The network elements may include well-known network elements capable of supporting a variety of communications protocols, formats, data, and technologies, including, but not limited to, circuit-switched and/or packet-switched communications. Examples of network elements may include, but are not limited to, gateways, gateway controllers, signaling proxies, media proxies, application servers, data stores, routers, switches, encoders, decoders, multiplexors, demultiplexors, service control points, firewalls, and any other elements potentially helpful for processing or transporting network traffic.

As will be appreciated, network infrastructure subsystem 130 may provide one or more paths over which network traffic may be transported. Elements of the network infrastructure subsystem 130 may be configured to selectively route network traffic over the different paths. Different network paths, or segments within the paths, may have different capacities, performance capabilities (e.g., bandwidth capabilities), and/or performance standards (e.g., session admission and quality of service policies), which may be taken into account in routing decisions.

Together, network infrastructure subsystem 130 and the PSTN 125 may provide a converged communications network subsystem configured to transport both packet-switched and circuit-switched traffic. Network infrastructure subsystem 130 may include one or more gateways and transcoders for bridging traffic between the PSTN 125 and the network infrastructure subsystem 130. As described below, a network-to-network interconnection interface may be configured to support peering of both packet-switched and non-packet-switched (e.g., circuit-switched) services between network domains 110.

As shown in FIG. 1, network domain 110-1 may also include a border element 150 communicatively connected to network infrastructure subsystem 130. Border element 150 may be configured to receive network traffic from and route network traffic over network infrastructure subsystem 130. Border element 150 may also be configured to receive network traffic from and route network traffic to devices external of network domain 110-1, including to/from other network domains 110-2 and 110-N by way of a packet-switched network-to-network interconnection interface. Border element 150 may include or be implemented on any suitable device, including an aggregation router, for example.

Network domain 110-1 may include a firewall 160-1 configured to provide security. As described below, firewall 160-1 may be configured to provide ingress and egress ports (e.g., "pinholes"), as well as network address translations, for signaling and media streams entering and exiting network domain 110-1.

As shown in FIG. 1, network domain 110-1 may include a service test subsystem 170, which may be communicatively connected to one or more network elements in network domain 110-1, including border element 150, for example. Service test subsystem 170 may be configured to perform tests and monitor network parameters and traffic in network domain 110-1, including parameters associated with the ingress and/or egress of network traffic. Service test subsystem 170 may include or utilize any suitable network testing and/or monitoring technologies and devices, including known testing and monitoring technologies and devices. In certain embodiments, service test subsystem 170 may include or be implemented as a service test tool and test tool controller.

Service test subsystem 170 may be configured to perform one or more tests designed to test compatibility and interoperability of a network-to-network interconnection interface established between network domain 110-1 and another network domain such as network domain 110-2. In some examples, service test subsystem 170 may also be configured for use in monitoring network traffic parameters and enforcing service policies (e.g., quality of service standards) for peered network traffic.

As mentioned, a packet-switched network-to-network interconnection interface may be provided between distinct network domains 110. With respect to network domain 110-1, one or more of the network elements in network domain 110-1 may be configured to provide the network-to-network interconnection interface, which may be configured to interconnect network elements in network domain 110-1 with network elements in other network domains 110-2 and 110-N. For example, a network-to-network interconnection interface may be provided and may interconnect border element 150 in network domain 110-1 with an element (not shown) in network domain 110-2.

An exemplary process of establishing a packet-switched network-to-network interconnection interface will now be described. For purposes of describing the exemplary process, an exemplary network-to-network interconnection interface between network elements in network domains 110-1 and 110-2 will be described. However, the exemplary process and network-to-network interconnection interface are illustrative only. Other embodiments may use similar processes to provide other network-to-network interconnection interfaces between distinct network domains 110.

Service providers or operators (e.g., collectively "service providers") associated with network domains 110-1 and 110-2 may exchange any information potentially useful for initiating establishment of a network-to-network interconnection interface. For example, service providers may exchange addresses (e.g., IP addresses) or domain names associated with network elements, as well as keys or other security information helpful for exchanging secure communications. For instance, a service provider associated with network domain 110-2 may provide a request to a service provider associated with network domain 110-1 for establishment of a packet-switched network-to-network interconnection interface between network domains 110-1 and 110-2. The request may provide or ask for information (e.g., addresses for connection-terminating network elements) useful for provisioning of a secure connection between elements of the network domains 110-1 and 110-2.

As shown in FIG. 1, at least one secure connection 180 may be established between distinct network domains 110. Any of the information described above may be used to provision a secure connection 180, which may interconnect network elements (e.g., border element 150 of network domain 110-1 and an element (not shown) associated with network domain 110-

2) of network domains 110-1 and 110-2. The secure connection 180 may be made over packet-switched network 115.

Secure connection 180 may include a secure IP-level connection configured to support message exchange between network elements of distinct network domains 110. In certain embodiments, a secure connection 180 may be based on Internet Protocol Security ("IPSec") technologies and may include at least one IPSec tunnel. The IPSec tunnel may be provisioned over any suitable type of connection, including a Digital Subscriber Line ("DSL") connection, for example. Other suitable types of secure connections 180 over packet-switched network 115 may be used in other embodiments.

The network elements terminating the secure connection 180 may be configured to validate and authenticate one another, including establishing IPSec authentication between one another, for example. In certain embodiments, Internet Key Exchange ("IKE") protocol with asymmetric encryption keys and Encapsulating Security Payload ("ESP") null ("ESP-null") may be used for key exchange and authentication. Internet Security Association Key Management Protocol ("ISAKMP") may be used to dynamically negotiate session keys for ESP-null encryption. Other security protocol, encryption, encapsulation, or authentication technologies may be used in other embodiments.

Secure connection 180 may provide a way for network elements of different network domains 110 to securely exchange information, including sensitive information such as network addresses, parameters, and capabilities, as well as service policies (e.g., performance standards). Accordingly, the risk of exposure to a security breach may be mitigated, and may allow for secure exchange of information that is useful for establishing a network-to-network interconnection interface between the network domains 110.

Secure connection 180 may be used for exchanging signaling messages between elements of network domains 110-1 and 110-2. Allowable signaling messages and signaling message attributes may be defined such that signaling messages that will be received, accepted, and processed can be restricted to predefined signaling messages having certain attributes. The definition of signaling messages and attributes may be referred to as a "signaling profile." Examples of acceptable signaling messages and attributes that may, by definition, be included in a signaling profile may include, but are not limited to, IP messages, Session Initiation Protocol ("SIP") messages, other messaging protocols, message types, sizes, headers, header sizes, and header information. Signaling messages defined by a signaling profile may be referred to as "predefined signaling messages."

In certain embodiments, the signaling profile may include a Session Initiation Protocol ("SIP") signaling profile specifying supported SIP messages, headers, parameters, and extensions, as well as supported SIP request messages and methods, response codes, and timer values. In certain implementations, the SIP signaling profile may leverage or otherwise be based on Internet Engineering Task Force ("IETF") RFC 3261, IETF RFC 4083 (Input 3$^{rd}$-Generation Partnership Project (3GPP) Release 5 Requirements on the Session Initiation Protocol (SIP), M. Garcia-Martin, May 2005), and the ATIS PTSC-2006-130 standards specification, the collective content of which is hereby incorporated by reference in its entirety.

In certain implementations, SIP headers and parameters such as "Request-URI," "To," "From," "Call-ID," "CSeq," "Max-Forwards," "Via," and "Contact" are specified in the signaling profile as being supported, or even mandatory in some examples, for use in originating and terminating access between distinct network domains 110. SIP headers and parameters such as "SUPPORTED" and "REQUIRE" may optionally be supported to allow for use of SIP extensions. SIP request messages and methods such as "INVITE," "ACK," "CANCEL," "UPDATE," "OPTIONS," and "BYE" may also be specified in the signaling profile as being supported, or even mandatory in some examples, for use in originating and terminating access between network domains 110. In some implementations, SIP request messages and methods such as "PRACK," "REFER," "SUBSCRIBE," "NOTIFY," "INFO," "MESSAGE," and "REGISTER," may be optionally included in the signaling profile as may be agreed to by the service providers associated with the distinct network domains. SIP response codes as defined in the aforementioned IETF RFC 3261 may be used. Other response codes defined in other well-known IETF RFCs may also be used.

While exemplary SIP signaling messages and message attributes have been describe above, this is illustrative only and not restrictive in any sense. In other embodiments, other suitable Internet Protocol based session control protocols may be used, including Hypertext Transfer Protocol ("HTTP"), Hypertext Transfer Protocol Secure ("HTTPS"), Simple Object Access Protocol ("SOAP"), Session Initiation Protocol for Instant Messaging and Presence Leveraging Extensions ("SIMPLE"), and Extensible Messaging and Presence Protocol ("XMPP"), for example. Such other messaging protocols may be used as an alternative to or in combination with SIP massages.

In certain embodiments, the signaling profile may specify that parameters in signaling messages, including endpoint-generated signaling parameters, be passed through the network-to-network interconnection interface unchanged. The signaling profile may also specify that the order of signaling messages be preserved across the network-to-network interconnection interface.

The signaling profile may specify a uniform way for network elements associated with distinct network domains 110 to communicate. The signaling profile may be utilized for establishment and updating of a network-to-network interconnection interface between network domains 110. For example, certain acts described below such as exchanging information for establishment or updating of a network-to-network interconnection interface may be performed using predefined signaling messages over secure connection 180 in accordance with the signaling profile.

The signaling profile may provide a certain level of protection from unscrupulous or irrelevant messages by allowing acceptance and processing of only those messages having the attributes that satisfy the signaling profile. Accordingly, the scope of the signaling profile may be defined broadly to favor flexibility or narrowly to favor control. The signaling profile, and consequently the balance between flexibility and control, may be defined as may best suit a particular implementation.

The signaling profile may be implemented in network domains 110 between which a network-to-network interconnection interface is being established. For example, signaling modules configured to operate in accordance with the signaling profile may be implemented in network domains 110-1 and 110-2. FIG. 2 illustrates exemplary functional elements configured to provide and utilize a packet-switched network-to-network interconnection interface between network domains 110-1 and 110-2. As shown in FIG. 2, network domains 110-1 and 110-2 may include signaling modules 220-1 and 220-2, respectively, which may be configured to exchange predefined signaling messages (e.g., SIP signaling messages), as defined by the signaling profile, over a secure connection 180. Data representative of a signaling profile may be stored in data stores 240-1 and 240-2.

Implementation of a signaling profile may be verified. For example, service test subsystem 170 shown in FIG. 1 may be configured to perform testing operations designed to verify the interoperability of implemented signaling profiles, e.g., the interoperability of signaling modules 220-1 and 220-2 with one another and/or with the defined signaling profile.

Various technologies may be used to support transport of signaling messages over secure connection. For example, IETF transport layer protocols such as User Datagram Protocol ("UDP"), Stream Control Transmission Protocol ("SCTP"), Transmission Control Protocol ("TCP"), and Transport Layer Security ("TLS") protocol may be used to transport signaling messages. Specific ports may be provisioned for ingress and egress of signaling streams. In certain embodiments, port 5060 or 5061 is used. Other technologies may be used, including Diffserv syntax (e.g., Diffserv Code Point ("DSCP") marked packets) and Layer 2 VLAN mapping as defined in IEEE 802.1p and IEEE 802.1q, the collective content of which is hereby incorporated by reference in its entirety. In certain embodiments, signaling messages may be forwarded by the network-to-network interconnection interface based on one or more of egress Layer 2 VLAN tags, egress default gateway IP addresses, egress Multi-Protocol Label Switching ("MPLS") headers, and egress VLAN tags as defined in IETF RFC 2547, the content of which is hereby incorporated by reference in its entirety.

Signaling for the network-to-network interconnection interface may be configured to utilize encapsulation, transcoding, and/or other technologies configured to enable non-packet-switched (e.g., non-IP based) signaling messages to be transported across the network-to-network interconnection interface. In certain embodiments, for example, Signaling System 7 ("SS7") Integrated Services Digital Network User Part ("ISUP") messages, which may be associated with voice calls over the PSTN 125 of FIG. 1, may be encapsulated within SIP messages. ISUP messages may be encapsulated in bodies of SIP message, and SIP message headers may be configured to support ISUP data translations and enable routing using ISUP information dependencies. In some examples, mid-call ISUP signaling messages may be carried using SIP "INFO" messages. SIP encapsulation technologies may utilize or be based on "SIP-T" as defined in IETF RFC 3372, "SIP-I" as defined in ITU-T Rec. Q.1912.5 profile C, and/or IETF RFCs 3323, 3324, 3325, 3326, 3398, and 3578, the collective content of which is hereby incorporated by reference in its entirety. Significantly, SIP encapsulation, or other signaling encapsulation techniques, may allow converged PSTN/IP network domains such as network domain 110 to peer both circuit-switched and packet-switched services over the network-to-network interconnection interface.

A signaling profile may be defined to support any of the signaling technologies, protocols, and settings described above.

As described further below, with the network-to-network interconnection interface established, signaling messages may be used to establish, modify, tear-down, and otherwise control service sessions (e.g., voice communication and multimedia sessions) between elements of network domains 110-1 and 110-2 interconnected by the network-to-network interconnection interface. The predefined signaling messages may be used to selectively route sessions over the network-to-network interconnection interface, as well as allocate resources for the sessions, typically on a session-by-session basis. For example, signaling modules 220-1 and 220-2 may be configured to dynamically and automatically allocate available network-layer addresses and transport-layer ports to be used by media bearer streams specified by session signaling messages. In some examples, this may be performed using Domain Name System ("DNS") queries (e.g., DNS-SRV or DNS-A queries) followed by appropriate signaling for establishing, tearing down, or otherwise controlling inter-network media paths for transport of media bearer streams.

In establishing a network-to-network interconnection interface, one or more media exchange technologies to be supported over the network-to-network interconnection interface may be determined and implemented. Service providers and/or network elements associated with network domains 110-1 and 110-2 may provide information descriptive of media exchange technologies to be supported over the network-to-network interconnection interface. The information may be determined and provided by the service providers, by signaling modules 220-1 and 220-2, or by a combination thereof. For example, initial setup of the network-to-network interconnection interface may involve service providers exchanging information, while subsequent exchanges of information may leverage the network-to-network interconnection interface and be performed by signaling modules 220-1 and 220-2 communicating over secure connection 180.

Through an exchange of information, agreement may be reached on the media exchange technologies and associated parameters that will be used for transporting media over the network-to-network interconnection interface. Media exchange technologies may include any suitable technologies related to transporting media over a network-to-network interconnection interface. Examples of media exchange technologies and parameters may include, but are not limited to, media formats, media types, media transport protocols, and interface connection and network types (e.g., link types), e.g., whether the use of public or private, secure or non-secure links or networks will be used. Any suitable media exchange technologies capable of transparently peering media, including any of the media types disclosed herein, across the network-to-network interconnection interface may be supported.

Agreed upon media exchange technologies may be implemented. Implementation may include providing media processing modules that are configured to process and utilize the media exchange technologies for peering media between distinct network domains 110. In FIG. 2, for example, media modules 230-1 and 230-2 have been implemented in network domains 110-1 and 110-2, respectively. The media modules 230-1 and 230-2 may be configured to use agreed upon media exchange technologies for peering network traffic between network domains 110-2 and 110-2.

Implementation of media exchange technologies may be verified. For example, service test subsystem 170 shown in FIG. 1 may be configured to perform testing operations designed to test implemented media exchange technologies, including testing the operations of the media modules 230-1 and 230-2 for interoperability with one another and/or with the agreed upon media exchange technologies. In certain examples, data representative of or related to the determined and implemented media exchange technologies may be stored in data stores 240-1 and 240-2.

In certain embodiments, media modules 230-1 and 230-2 may be configured to transport media (e.g., voice media) across the network-to-network interconnection interface using Real Time Protocol ("RTP") over User Datagram Protocol ("UDP"), Reliable User Datagram Protocol ("R-UDP"), or other suitable transport protocol. Media (e.g., voice media) may be encapsulated using RTP for transmission over UDP to support end-to-end network transport. In certain embodiments, RTP specifications for the network-tonetwork interconnection interface may leverage or otherwise be based on IETF RFCs 2733, 2793, 3550, 3551, 3605, 3611, and 3804, the collective content of which is hereby incorporated by reference in its entirety. In some implementations, well known ITU-T Group 3 (G3) and T.38 (Annex D) based facsimile media transmissions may be supported across the network-to-network interconnection interface.

Media transport, or at least certain components of media transport may be negotiated on a session-by-session basis as part of session setup signaling exchange between signaling modules 220-1 and 220-2. For certain voice media sessions, for example, Codec negotiation may be performed during session setup. In some embodiments, well known G.711 and/or G.729 Codecs may be supported.

The network-to-network interconnection interface may be configured to support technologies that enable monitoring of one or more network traffic and service parameters, which data can be used to enforce service policies for sessions peered across the network-to-network interconnection interface. For example, Real-Time Control Protocol ("RTCP") as defined in IETF RFC 3605 and/or Real-Time Control Protocol Extended Reports ("RTCP-XR") as defined in IETF RFC 3611, the collective content of which is hereby incorporated by reference in its entirety, may be implemented for media exchange over the network-to-network interconnection interface. Using one or both of these protocols, the network elements providing the network-to-network interconnection interface may be configured to monitor one or more performance parameters associated with transport of network traffic over the network-to-network interconnection interface. Such parameters may be indicative of performance levels and useful for enforcing performance standards and/or other service policies to which the service providers have agreed. Examples of performance parameters that may be monitored include, but are not limited to, packet loss and discard parameters, delay parameters, burst parameters, jitter parameters, session transmission parameters, and configuration (e.g., resource provisioning and release) parameters.

Monitored network parameters may be exchanged between network domains 110-1 and 110-2. In some examples, signaling modules 220-1 and 220-2 may be configured to use predefined signaling messages to exchange the monitored parameters over secure connection 180. The monitoring and exchange of monitored parameters may be performed as agreed to in advance by the service providers associated with network domains 110-1 and 110-2. As described below, monitored network parameters may be used in enforcing service policies, including selectively routing sessions based on service policies and at least one monitored performance parameter. In some examples, monitored and/or exchanged network parameters may be stored in data stores 240-1 and 240-2.

Figure 2:
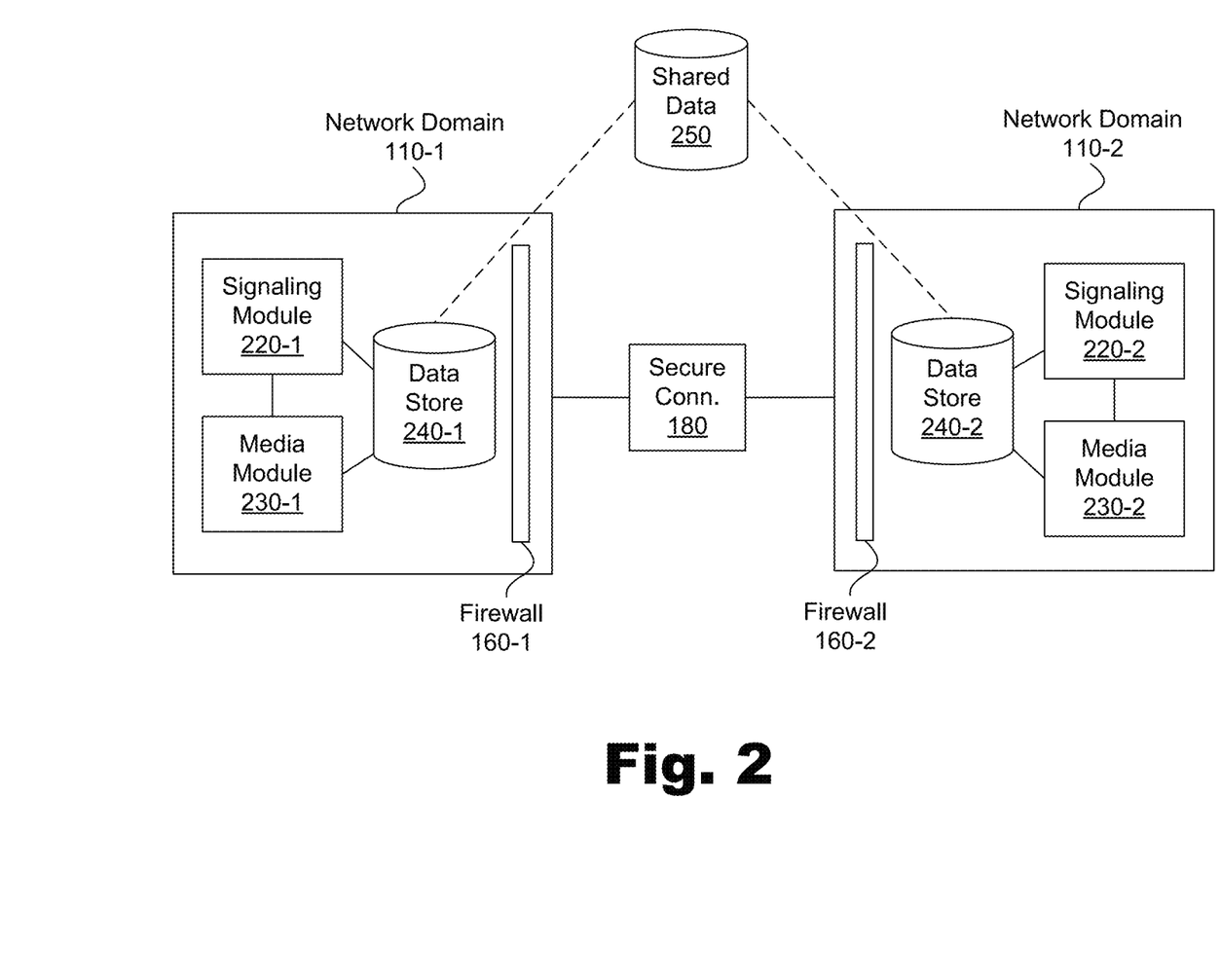
FIG. 2 illustrates exemplary functional elements configured to provide and utilize a packet-switched network-to-network interconnection interface.

As shown in FIG. 2, network domains 110-1 and 110-2 may include firewalls 160-1 and 160-2, respectively. As mentioned above, signaling messages may be used to allocate and de-allocate available network layer addresses and transport layer ports. Firewall control functions may be configured to inspect signaling messages and instruct firewalls 160-1 and 160-2 to open and close pinholes for media streams as specified in the signaling messages. Such dynamically controlled media pinholes may be maintained for durations of respective media sessions. Signaling modules 220-1 and 220-2 may provide firewall information (e.g., port and address information) associated with sessions to media modules 230-1 and 230-2, respectively, which may be configured to use the firewall information to establish media paths and to transport media over the network-to-network interconnection interface. Media modules 230-1 and 230-2 may be configured to detect periods of media inactivity and instruct firewalls 160-1 and 160-2 to close associated pinholes when inactivity meets predefined media inactivity thresholds.

Signaling and media border processing information may be exchanged between network domains 110-1 and 110-2 for use in establishing a network-to-network interconnection interface. Signaling and media border processing information, which may be exchanged over secure connection 180 in some examples, may include, but is not limited to, network address information (e.g., IP addresses or domain names that can be resolved to IP addresses) and reachability information for border network elements configured to function as termination points (i.e., points of entry and/or exit) for traffic peered over the network-to-network interconnection interface. Reachability information may indicate available routes by which border network elements may be reached and may include network addresses (e.g., IP addresses), ports, and/or network address translation information associated with the routes.

In certain examples, the signaling and media border processing information may include information descriptive of signaling modules 220-1 and 220-2 and media modules 230-1 and 230-2, or network elements on which the same modules are implemented. In such examples, border processing information for signaling module 220-1 and media module 230-1 may be provided to network domain 110-2, and border processing information for signaling module 220-2 and media module 230-2 may be provided to network domain 110-1. In some examples, the border processing information may include information descriptive of firewalls 160-1 and 160-2, including ports and network addressing information that can be used for transporting media through the firewall. Border processing information may be stored in data stores 240-1 and 240-2 and may be used for routing network traffic over the network-to-network interconnection interface between network elements identified by the border processing information.

Information associated with access devices 120 may be exchanged between network domains 110 for use in establishing a network-to-network interconnection interface. For example, information descriptive of access devices 120 in network domain 110-1 may be provided to network domain 110-2, and information descriptive of access devices 120 in network domain 110-2 may be provided to network domain 110-1. The access device information, which may be exchanged over secure connection 180 in some examples, may include network addresses (e.g., IP addresses or domain names that can be resolved to IP addresses) and reachability information for the access devices 120. Reachability information may indicate available routes by which access devices 120 may be reached (e.g., over network infrastructure subsystem 130 of FIG. 1) and may include IP addresses, ports, and/or network address translation information associated with the routes. The information may also be descriptive of capabilities of the access devices 120, including, but not limited to, signaling and media formats, protocols, and technologies supported by the access devices 120. Signaling modules 220-1 and 220-2 and media modules 230-1 and 230-2 may be configured to use the access device information to process (e.g., transcode) and selectively route network traffic toward appropriate access devices 120, including over the network-to-network interconnection interface for inter-domain traffic. In some examples, access device information may be stored in data stores 240-1 and 240-2.

In certain embodiments, access device information may be used to control which access devices 120 are allowed to participate in end-to-end sessions peered between network domains 110, or to control the extent to which certain access devices 120 are allowed to participate. For example, a service provider associated with network domain 110-1 may elect to control which access devices 120 will be allowed to participate in inter-domain sessions, including accessing services peered over the network-to-network interconnection interface. This may provide service providers with significant control as well as a potential revenue stream from subscribers who may be willing to pay for inter-network communications, services, or service features.

Service policies may be determined, implemented, and enforced for network traffic peered over the network-to-network interconnection interface. For example, service policy information may be exchanged between network domains 110-1 and 110-2. The information may be exchanged by service providers associated with network domains 110-1 and 110-2 or by signaling modules 220-1 and 220-2 over secure connection 180. The information may be descriptive of policy standards to be implemented and enforced for sessions peered across the network-to-network interconnection interface. The service policies for peered services may include or be based on service policies enforced within network domains 110-1 and 110-2.

An established network-to-network interconnection interface may be configured to enforce a variety of policies for different services. For example, policy information may indicate different treatments for peering of services terminating within a network domain 110 versus peering of transitory services that do not terminate within the network domain 110. Transitory services refer to service sessions that do not have an endpoint within a peer network domain 110. For example, a session may be considered for peering over the network-to-network interconnection interface from network domain 110-1 to network domain 110-2. If the target destination endpoint for the session is not within network domain 110-2, transit policies may be enforced when selectively routing the session. Accordingly, service providers can customize treatment of transitory service sessions to be considered for peering over the network-to-network interconnection interface, and the network-to-network interconnection interface can be configured to process such sessions accordingly. Policies applicable to transitory service sessions may be referred to as "transit policies."

Service policies may include performance policies, which may specify performance thresholds to be enforced for peered services. Performance threshold information descriptive of performance policies may be exchanged between network domains 110-1 and 110-2. The information may be exchanged by service providers associated with network domains 110-1 and 110-2 or by signaling modules 220-1 and 220-2 over secure connection 180 in some examples. The information may be descriptive of end-to-end performance standards (i.e., thresholds) to be implemented and enforced for sessions peered across the network-to-network interconnection interface. The thresholds may include, but are not limited to, bandwidth thresholds (e.g., network segment bandwidth thresholds such as maximum allowable bandwidth utilization rates), bandwidth allocation and de-allocation policies, packet loss thresholds, delay thresholds, jitter thresholds, session admission policies and thresholds (e.g., maximum number of active sessions on a link or across the network-to-network interconnection interface), packet flow and prioritization policies, packet marking information, rate limiting information (e.g., ingress and egress rate thresholds), maximum number of inbound sessions, maximum number of outbound sessions, maximum burst or sustained number or rate of SIP signaling "INVITE" messages or active sessions, burst rate window size in seconds, and any other information potentially helpful for identifying and enforcing performance standards for network traffic associated with sessions peered over the network-to-network interconnection interface.

Performance threshold information may be associated with service level standards, including such standards specified in service level agreements. For a VoIP service, for example, a service level agreement may specify specific performance parameters to be maintained. Examples of such performance parameters may include, but are not limited to, packet latency, packet loss, call quality parameters (e.g., latency, jitter, loss, Mean Opinion Score ("MOS"), Echo, and Clipping thresholds), call setup parameters (e.g., post-dialing delay, call drop rate, error rate, answer seizure ratio, call completion ratio, and call loss ratio thresholds), packet transmission parameters during the call, and call tear down parameters (e.g., session release time, call tear down time, error rate, and call loss ratio thresholds).

Agreed upon performance standards may be implemented and enforced over a network-to-network interconnection interface. The functional elements shown in FIG. 2 (e.g., signaling modules 220-1 and 220-2 and media modules 230-1 and 230-2) may be configured to implement and enforce the standards. For example, the functional elements may be configured to utilize the performance threshold information for limiting rates and/or quantities, prioritizing traffic, allocating bandwidth, and determining whether or not to admit sessions. As an example, bandwidth may be allocated in a manner that maintains specified quality of service thresholds associated with services. For instance, if for at least a predetermined length of time bandwidth utilization exceeds a predetermined threshold for a primary network-to-network interconnection, sessions may be refused admission over the connection, or sessions may be routed or rerouted over a secondary interconnection. Performance standards may be implemented and enforced for both signaling and media sessions. In some examples, data representative of determined and implemented performance thresholds may be stored in data stores 240-1 and 240-2 for use by signaling modules 220-1 and 220-2 and/or media modules 230-1 and 230-2. For instance, signaling modules 220-1 and 220-2 may consider the performance threshold information and selectively route sessions based at least in part on performance threshold information.

Any monitored performance parameters, which may be monitored as described above, may be compared to the performance thresholds, and the results of the comparisons may be used for enforcing adherence to the performance thresholds, including selectively routing sessions over the network-to-network interconnection interface based on monitored network parameters in a manner that promotes enforcement of the performance thresholds.

As mentioned above, performance threshold information may include packet marking information. Packet marking information may be associated with corresponding performance thresholds. In certain embodiments, service providers associated with network domains 110-1 and 110-2 may agree to packet marking strategies and treatment of packets based on the markings to be used for traffic peered across the network-to-network interconnection interface. Packet marking strategies may be used for both signaling and media traffic. In some examples, the packet marking strategies may be designed to provide low-loss signaling traffic and low-latency and low-jitter media traffic from one endpoint to another endpoint.

Agreed upon packet marking strategies may enable peering of different classes of network traffic over the networkto-network interconnection interface. For example, packets may be assigned to different queues associated with different quality of service levels based on packet markings. In certain embodiments, network-to-network interconnection interface signaling packets may be marked as IP Precedence 4/DSCP Class Selector 4 or IP Precendence 5/DSCP Class Selector 5 packets, and network-to-network interconnection interface media packets may be marked as IP Precedence 5/DSCP Class Selector 5 as defined in IETF RFCs 2474 and 3264, the collective content of which is hereby incorporated by reference in its entirety. Of course, other packet markings strategies may be used in other embodiments.

From packet markings, agreed upon performance thresholds to be maintained for corresponding classes of network traffic peered over the network-to-network interconnection interface may be identified and enforced. Different services may be assigned different performance thresholds. Accordingly, a variety of performance standards can be implemented and enforced over the network-to-network interconnection interface, including different performance standards associated with real-time, soft real-time, and non-real-time services. This helps enable the network-to-network interconnection interface to flexibly support transparent peering of a variety of different services between distinct network domains 110.

The functional elements of system 100 shown in FIG. 2 may be configured to provide the network-to-network interconnection interface based on one or more of the predefined signaling messages, media exchange technologies, signaling and media border processing information, access device information, service policy information, and any other information described above. In certain embodiments, one or more of the signaling modules 220-1 and 220-2 and media modules 230-1 and 230-2 may be configured to provide the network-to-network interconnection interface based on data stored in data stores 240-1 and 240-2. Information useful for establishing the network-to-network interconnection interface and for peering sessions over the network-to-network interconnection interface, including any such information described herein, may be stored in data stores 240-1 and 240-1 and may be referred to as "interface parameters." Examples of data that may be stored in data stores 240-1 and 240-2 may include, but are not limited to, data representative of information exchanged between network domains 110-1 and 110-2, Domain Name System ("DNS") information, network address information, network compatibility and translation information (e.g., PSTN addresses and translation information), signaling profiles, supported media exchange technologies, performance standards, reachability information, access device information, monitored network parameters, and network update information.

Data stores 240-1 and 240-1 may also include data and/or applications that can be used to provide specific services across the network-to-network interconnection interface. For example, data store 240-1 may include data representative of media, features, or applications that can be peered across the network-to-network interconnection interface. As an example, data store 240-1 may include video media services that can be provided to network domain 110-2 over the network-to-network interconnection interface.

In certain embodiments, at least a subset of data stored in data stores 240-1 and 240-2 may be shared, i.e., accessible to both network domains 110-1 and 110-2. Such shared data may be represented as shared data 250 as illustrated in FIG. 2. Shared data may be accessed for use in providing the network-to-network interconnection interface and/or peering sessions over the network-to-network interconnection interface. For example, shared data may include information useful for looking up and translating PSTN telephone numbers (e.g., an E.164 telephone number) to packet-switched network addresses or fully qualified domain names that can be resolved to one or more network addresses.

Each of the data store 240-1 and 240-2 may include one or more data storage mediums, devices, or configurations and employ any type, form, and combination of well known storage media, including hard disk drives, read-only memory, caches, databases, optical media, and random access memory. Data stores 240-1 and 240-2 may include any known technologies useful for storing, updating, searching, modifying, accessing, retrieving, and deleting electronic data.

In certain embodiments, before live service sessions are peered over an established network-to-network interconnection interface one or more tests may be conducted to verify that compatible, interoperable, and acceptable interconnections can be formed over the network-to-network interconnection interface. The tests may be designed to verify that signaling and media transport interactions function properly at the network-to-network interconnection interface, and that performance standards are maintained. Service test subsystem 170 of FIG. 1 may be configured to perform such testing and verification functions.

With a network-to-network interconnection interface established between network domains 110-1 and 110-2, network traffic associated with service sessions may be peered across the network domains 110-1 and 110-2. FIG. 3 illustrates an example of service session peering across an exemplary network-to-network interconnection interface 310 ("NNII 310") that has been established for peering services between network domains 110-1 and 110-2. In FIG. 3, dashed communication lines represent session signaling traffic and solid communication lines represent session media traffic.

Figure 3:
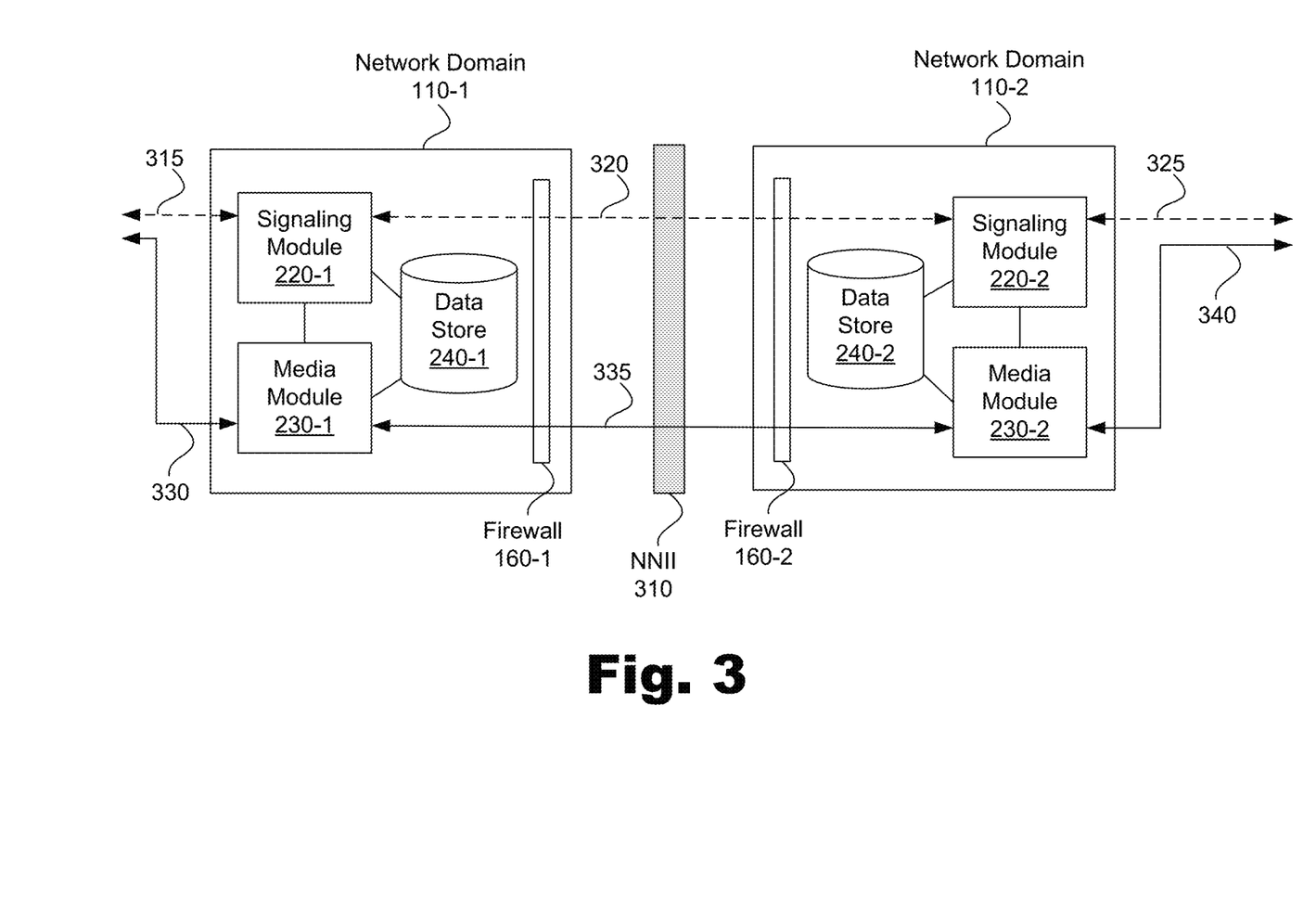
FIG. 3 illustrates an example of service peering across an exemplary network-to-network interconnection interface.

In the illustrated example, signaling module 220-1 may receive signaling messages from a source (e.g., an access device 120 or other network element in network domain 110-1), as represented by reference number 315 in FIG. 3. The signaling messages may be configured to establish a media session (e.g., a voice call session) with a destination, such as an endpoint in network domain 110-2, for example. Signaling module 120-1 may use information included in the signaling messages and information in data store 240-1 to selectively route the signaling messages. For example, signaling module 120-1 may determine from the information that the session is directed to an element in network domain 110-2 and route signaling messages over NNII 310 to signaling module 220-2 as represented by reference number 320 in FIG. 3. As described above, in certain embodiments, all parameters in the signaling messages 315 may be passed through to signaling module 220-2 in signaling messages 320.

Signaling module 220-2 may receive and process the signaling messages 320, including verifying that routing of the corresponding session to the identified target destination is allowed. If such action is allowed, signaling module 220-2 may route signaling messages 325 toward the destination, which may be an access device 120 in network domain 120 or an external device. The signaling messages 325 may notify the target destination of an incoming session.

Signaling modules 220-1 and 220-2 may communicate with media modules 230-1 and 230-2, respectively, such that if the target destination accepts the session, the media modules 230-1 and 230-2 may establish media paths 330, 335, and 340, as shown in FIG. 3. Signaling path 320 and media path 335 may be established, modified, and released in accordance with any of the processes and parameters described herein in relation to a packet-switched network-to-network interconnection interface such that the session can be transparently peered across NNII 310 in a manner that may maintain network reliability, service integrity, and network security.

While FIG. 3 illustrates an exemplary peering of a session over NNII 310, other sessions may be established, modified, and torn down on a session-by-session basis. Significantly, sessions may be established for different service peering instances without affecting other sessions. As an example, during the session shown in FIG. 3, another session may be established, even between the same endpoints, without affecting the first session. For instance, assuming that the first session is a voice session associated with a VoIP service, and the end users wish to share a video without interrupting the voice session. The network-to-network interconnection interface may be configured to establish a video session without interrupting or affecting the voice session. Both sessions may be peered over the network-to-network interconnection interface without need for special connections and arrangements.

During operation of a network-to-network interconnection interface provided for peering services between network domains 110-1 and 110-2, network elements of the network domains 110-1 and 110-2, or service providers associated with the network domains 110-1 and 110-2, may exchange update information descriptive of network traffic parameters and/or other network attributes, services, and features. In some examples, update information may include network upgrade information, which may be descriptive of changes to network capacity, capabilities, services, etc. The network upgrade information may be provided to a peering network, and the network-to-network interconnection interface between the distinct network domains 110 may be updated based on the update information. In certain embodiments, signaling modules 220-1 and 220-2 may be configured to use predefined signaling messages to pass update information over the network-to-network interconnection interface and to update the network-to-network interconnection interface based on the update information. Accordingly, a service provider may utilize the network-to-network interconnection interface to conveniently add, modify, remove, or otherwise manage services for peering across the network-to-network interconnection interface.

For example, a network-to-network interconnection interface between network domains 110-1 and 110-2 may be configured to support peering of a first set of services between the network domains 110-1 and 110-2. Update information may be exchanged and the network-to-network interconnection interface updated accordingly such that the updated network-to-network interconnection interface may be configured to support peering of a second set of services between the network domains 110-1 and 110-2. As an example, the second set of services may include an additional service for which a service provider has elected to allow peering over the network-to-network interconnection interface.

Thus, the service provider may utilize the network-to-network interconnection interface to conveniently provide information that can be used to reconfigure the network-to-network interconnection interface to support the new service. As an example, a video service may be introduced in network domain 110-1. The video service may be configured for peering across the network-to-network interconnection interface in accordance with the principles described herein. Update information descriptive of the video service (e.g., video server IP address and reachability information) may be exchanged between network domains 110-1 and 110-2, and the functional elements providing the network-to-network interconnection interface may use the update information to update the network-to-network interconnection interface for peering of the video service from network domain 110-1 to network domain 110-2. With the network-to-network interconnection interface architecture described herein, the video service may be conveniently added for peering over the network-to-network interconnection interface, thus extending its reach, without having to negotiate a new arrangement or introduce special and different interconnections for the service.

A network-to-network interconnection interface may be configured to support peering for a variety of scenarios, including peering between PSTN network domains ("PSTN-to-PSTN" peering), PSTN and IP domains ("IP-to-PSTN" or "PSTN-to-IP" peering), and IP domains ("IP-to-IP" peering). In certain implementations, the network-to-network interconnection interface may be used as a trunk line between network domains, which trunk line may be used to replace a PSTN trunk line in some implementations.

Figure 4:
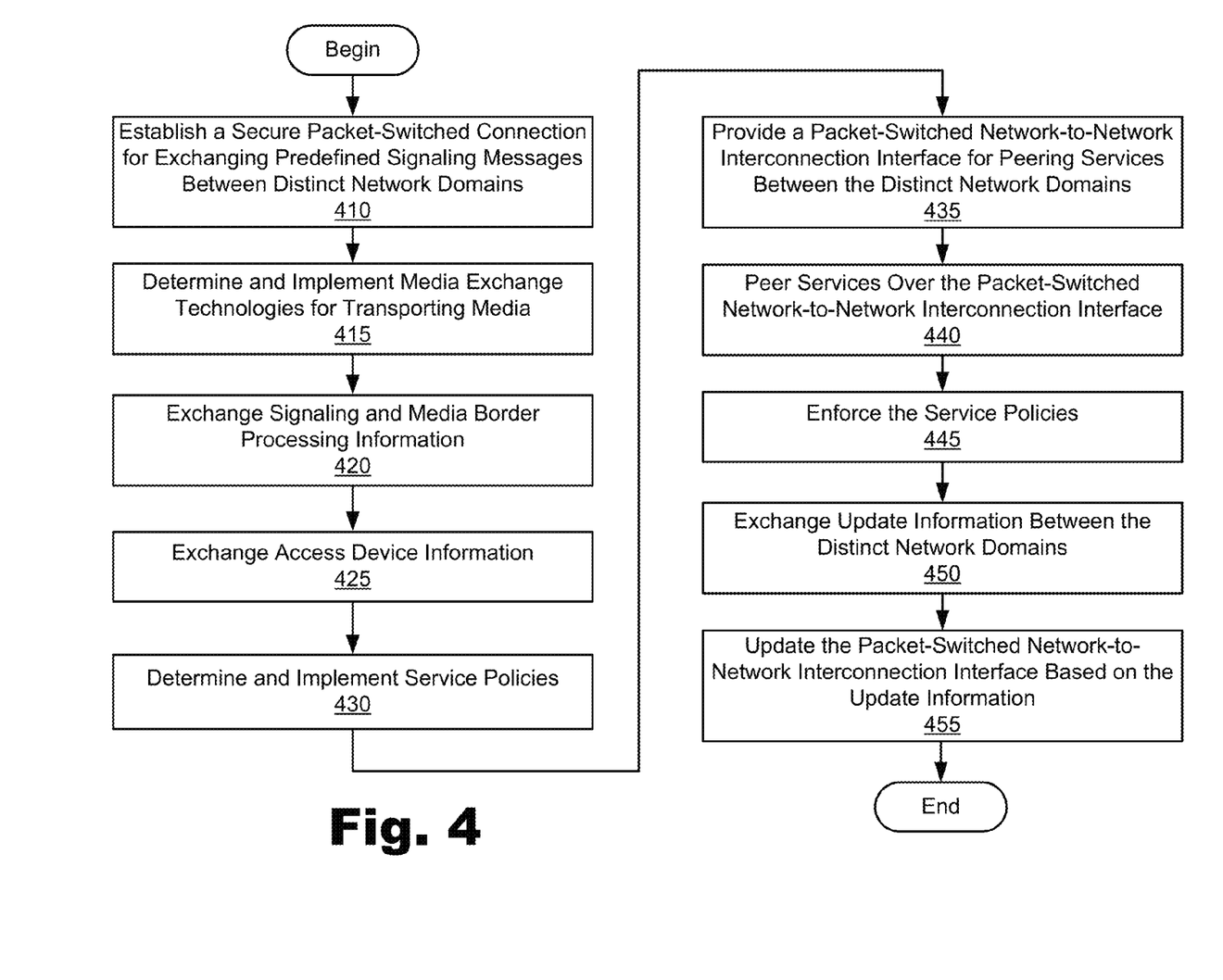
FIG. 4 illustrates an exemplary method of providing and using a packet-switched network-to-network interconnection interface for peering service sessions between distinct network domains.

FIG. 4 illustrates an exemplary method of providing and using a packet-switched network-to-network interconnection interface for peering services between distinct network domains. While FIG. 4 illustrates exemplary steps according to one embodiment, other embodiments may omit, add to, reorder, and/or modify any of the steps shown in FIG. 4.

In step 410, a secure packet-switched connection is established for exchanging predefined signaling messages between distinct network domains. Step 410 may be performed in any of the ways described above, including establishing a secure connection between border elements such that signaling modules 220-1 and 220-2 may communicate over the secure connection in accordance with a signaling profile.

In step 415, media exchange technologies are determined and implemented for transporting media between the distinct network domains. Step 415 may be performed in any of the ways described above.

In step 420, signaling and media border information are exchanged between the distinct network domains. Step 415 may be performed in any of the ways described above.

In step 425, access device information is exchanged between the distinct network domains. Step 425 may be performed in any of the ways described above.

In step 430, service policies associated with the distinct network domains are determined and implemented. Step 430 may be performed in any of the ways described above.

In certain embodiments, any of steps 415-430 may be performed using predefined signaling messages to exchange data over the secure connection.

In step 435, a packet-switched network-to-network interconnection interface is provided for peering services between the distinct network domains. Step 435 may be performed in any of the ways described above, including providing the packet-switched network-to-network interconnection interface based on the predefined signaling messages, media exchange technologies, signaling and media border processing information, access device information, and service policies associated with steps 410-430.

In step 440, services are peered over the packet-switched network-to-network interconnection interface. Step 440 may be performed in any of the ways described above, including signaling modules 220-1 and 220-2 establishing, modifying, and tearing down signaling sessions and directing media modules 230-1 and 230-2 in establishing, modifying, and tearing down media transport sessions associated with service sessions being peered over the packet-switched network-to-network interconnection interface.

In step 445, service policies are enforced for the services peered over the packet-switched network-to-network interconnection interface. Step 445 may be performed in any of the ways described above, including signaling modules 220-1 and 220-2 selecting controlling routing and admission of sessions over the packet-switched network-to-network interconnection interface.

In step 450, update information is exchanged between the distinct network domains. Step 450 may be performed in any of the ways described above, including signaling modules 220-1 and 220-2 using predefined signaling messages and exchanging the update information over the secure connection.

In step 455, the packet-switched network-to-network interconnection interface is updated based on the update information. Step 455 may be performed in any of the ways described above, including updating parameters stored in data stores 240-1 and/or 240-2 with the update information. In some examples, the update may expand the services that may be peered over the packet-switched network-to-network interconnection interface.

Any of the processes described above may be performed using automated, manual, or a combination of automated and manual acts. As an example, certain acts may be performed manually for initial setup of the packet-switched network-to-network interconnection interface but may thereafter be performed using automated acts, or a combination of automated and manual acts.

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. The above description and accompanying drawings are accordingly to be regarded in an illustrative rather than a restrictive sense.

What is claimed is:

1. A method comprising:
    exchanging, by at least one network element of a first network domain, signaling and media border processing information with at least one network element of a second network domain by way of a secure packet-switched connection between the at least one network element of the first network domain and the at least one network element of the second network domain;
    exchanging, by the at least one network element of a first network domain, service policy information with the at least one network element of the second network domain by way of the secure packet-switched connection;
    peering, by the at least one network element of the first network domain, at least one session associated with a first service type between the first network domain and the second network domain by way of a packet-switched network-to-network interconnection interface in accordance with the exchanged signaling and media border processing information;
    peering, by the at least one network element of the first network domain, at least one other session associated with a second service type between the first network domain and the second network domain by way of the packet-switched network-to-network interconnection interface in accordance with the exchanged signaling and media border processing information;
    enforcing, by the at least one network element of the first network domain, a first performance threshold specified by the service policy information for the peering of the at least one session associated with the first service type; and
    enforcing, by the at least one network element of the first network domain, a second performance threshold specified by the service policy information for the peering of the at least one other session associated with the second service type.

2. The method of claim 1, further comprising updating, by the at least one network element of a first network domain, a previous version of the packet-switched network-to-network interconnection interface to support both the peering of the at least one session associated with the first service type and the peering of the at least one other session associated with the second service type between the first network domain and the second network domain in accordance with the exchanged signaling and media border processing information and the exchanged service policy information.

3. The method of claim 2, wherein, before the updating, the previous version of the packet-switched network-to-network interconnection interface is configured to support only the peering of the at least one session associated with the first service type.

4. The method of claim 1, wherein the exchanging of the signaling and media border processing information with the at least one network device of the second network domain by way of the secure packet-switched connection is performed by the at least one network element of the first network domain exchanging one or more signaling messages defined in accordance with a signaling profile.

5. The method of claim 1, further comprising performing, by a service test subsystem before the peering of the at least one session associated with the first service type and the peering of the at least one other session associated with the second service type, one or more testing operations configured to test an interoperability of the at least one network element of the first network domain and the at least one network element of the second network domain across the packet-switched network-to-network interconnection interface.

6. The method of claim 1, further comprising:
    exchanging, by the at least one network element of the first network domain, one or more session signaling messages defined in accordance with a signaling profile with the as least one network element of the second network domain across the packet-switched network-to-network connection interface; and
    wherein the peering of the at least one session associated with the first service type between the first network domain and the second network domain by way of the packet-switched network-to-network interconnection interface comprises at least one of selectively routing the at least one session over the packet-switched network-to-network interconnection interface and allocating at least one resource for the at least one session based on the one or more session signaling messages.

7. The method of claim 6, wherein the signaling profile comprises a Session Initiation Protocol ("SIP") signaling profile specifying one or more supported SIP messages.

8. The method of claim 7, wherein the one or more supported SIP messages comprise at least one of a SIP "INVITE" message, a SIP "ACK" message, a SIP "CANCEL" message, a SIP "UPDATE" message, a SIP "OPTIONS" message, and a SIP "BYE" message.

9. The method of claim 7, wherein the SIP signaling profile further specifies at least one of supported headers, supported parameters, supported extensions, supported response codes, and supported timer values associated with the supported SIP messages.

10. The method of claim 6, wherein the signaling profile specifies that one or more parameters in the one or more signaling messages be passed through the network-to-network interconnection interface unchanged.

11. The method of claim 6, wherein the signaling profile specifies that an order of the one or more signaling messages be preserved across the network-to-network interconnection interface.

12. The method of claim 6, further comprising accepting and processing, by the at least one network element of the first network domain, only the one or more signaling messages having attributes that satisfy the signaling profile.

13. The method of claim 1, wherein:
the first service type comprises a terminating service;
the at least one session of the first service type has an endpoint within one of the first network domain and the second network domain;
the second service type comprises a transitory service; and
the at least one other session of the second service type does not have an endpoint one of the first network domain and the second network domain.

14. The method of claim 1, wherein the peering of the at least one session associated with the first service type and the peering of the at least one other session associated with the second service type between the first network domain and the second network domain comprise:
peering the at least one session associated with the first service type from the first network domain to the second network domain; and
peering the at least one other session associated with the second service type from the first network domain to the second network domain.

15. The method of claim 1, wherein the peering of the at least one session associated with the first service type and the peering of the at least one other session associated with the second service type between the first network domain and the second network domain comprise:
peering the at least one session associated with the first service type from the second network domain to the first network domain; and
peering the at least one other session associated with the second service type from the second network domain to the first network domain.

16. The method of claim 1, embodied as computer-executable instructions on at least one non-transitory computer-readable medium.

17. A method comprising:
exchanging, by at least one network element of a first network domain, signaling and media border processing information with at least one network element of a second network domain by way of a secure packet-switched connection between the at least one network element of the first network domain and the at least one network element of the second network domain;
exchanging, by the at least one network element of a first network domain, service policy information with the at least one network element of the second network domain by way of the secure packet-switched connection;
peering, by the at least one network element of the first network domain, a plurality of sessions associated with different service types between the first network domain and the second network domain by way of a packet-switched network-to-network interconnection interface in accordance with the exchanged signaling and media border processing information; and
enforcing, by the at least one network element of the first network domain based on service type, different performance thresholds specified by the service policy information for the peering of the plurality of sessions associated with the different service types.

18. The method of claim 17, embodied as computer-executable instructions on at least one non-transitory computer-readable medium.

19. A system comprising:
at least one network element of a first network domain and that:
exchanges signaling and media border processing information with at least one network element of a second network domain by way of a secure packet-switched connection between the at least one network element of the first network domain and the at least one network element of the second network domain,
exchanges service policy information with the at least one network element of the second network domain by way of the secure packet-switched connection,
peers at least one session associated with a first service type between the first network domain and the second network domain by way of a packet-switched network-to-network interconnection interface in accordance with the exchanged signaling and media border processing information,
peers at least one other session associated with a second service type between the first network domain and the second network domain by way of the packet-switched network-to-network interconnection interface in accordance with the exchanged signaling and media border processing information,
enforces a first performance threshold specified by the service policy information for the peering of the at least one session associated with the first service type, and
enforces a second performance threshold specified by the service policy information for the peering of the at least one other session associated with the second service type.

20. The system of claim 19, wherein the peering of the at least one session associated with the first service type and the peering of the at least one other session associated with the second service type between the first network domain and the second network domain comprise:
peering the at least one session associated with the first service type from the first network domain to the second network domain; and
peering the at least one other session associated with the second service type from the first network domain to the second network domain.

21. The system of claim 20, wherein:
the first service type comprises a terminating service;
the at least one session of the first service type has an endpoint within the second network domain;
the second service type comprises a transitory service; and
the at least one other session of the second service type does not have an endpoint within the second network domain.

* * * * *